3,192,124
METHOD OF MAKING PHAGE RESISTANT BACTERIAL CULTURE MEDIUM
Saeed Kheshgi, Glenview, Ill., assignor to National Dairy Products Corporation, New York, N.Y., a corporation of Delaware
No Drawing. Filed Nov. 19, 1962, Ser. No. 238,743
5 Claims. (Cl. 195—102)

The present invention generally relates to starter cultures and more particularly it relates to an improved phage-resistant bacterial starter culture medium and to a method of making the same.

It is often difficult to culture certain strains of bacteria without encountering eventual debilitation of the bacteria due to the lytic action of bacteriophage normally associated therewith. Bacteriophage, commonly referred to as phage, comprises the lytic agent which brings about the break down of bacterial cells. The phage may be considered as a disease-causing agent in bacteria. The lysis due to the phage is transmitted indefinitely in series, from one growth culture to the next, since the phage is almost impossible to physically separate from the bacteria in the cultures.

Although considerable amounts of data are available on the characteristics of phage, there are few effective methods of overcoming the problem of phage in bacteria. Thus, if the phage is inhibited or killed in a bacterial culture, there is danger that injury to the bacteria will be sustained so that the bacteria will die or will not freely multiply.

The problem of obtaining good bacterial growth is particularly important in cheesemaking since various types of bacterial cultures, known as starters, are ordinarily added during many cheese-make procedures and, in considerable part, affect the acidity or flavor or gas-forming or other properties of the cheese. Selected strains of bacteria may be carefully cultured for their particularly beneficial effects in the cheese-make procedure and their destruction due to the action of phage can represent a substantial loss.

Various attempts have been made to provide suitable bacterial culture media which are resistant to the development of phage. One such medium has been successful in that it resists substantial phage development during growth of certain strains of bacteria, particularly those suitable for lactic acid development during cheesemaking. Such medium is a skim milk which has a very low calcium concentration. Apparently, calcium is required for phage development, and the absence of calcium in the milk suppresses phage development. Unfortunately, such medium has some serious drawbacks. In this regard, it is likely to inhibit the normal growth of the bacteria. Occasionally, bacteria cultured in such a medium may even die out. The medium in any event does not provide for optimal growth and activity of the bacteria upon repetitive transfer.

Now, however, a phage-resistant culture medium for bacteria has been discovered which medium also stimulates optimal growth of bacteria therein. It has been unexpectedly found that once lactic acid-developing bacteria containing phage are cultured in the medium of the present invention, and that the development of phage is inhibited, such bacteria can then be transferred to another medium (i.e., seeded in another medium) which medium is non-resistant to phage development, and the bacteria can be cultured in such non-resistant medium, without deleterious phage development.

Accordingly, it is the principal object of the present invention to provide an improved phage-resistant bacterial culture medium. It is a further object of the present invention to provide a method of making an improved phage-resistant bacterial culture medium. It is also an object of the present invention to provide a phage-resistant bacterial culture medium which inhibits phage development while stimulating development of bacteria in the medium. It is a still further object of the present invention to provide an improved phage-resistant culture medium which is particularly suitable for growth therein of lactic acid-developing cheese starter bacteria. Further objects and advantages of the present invention will be apparent from a study of the following detailed description.

The present invention generally comprises a method of producing an improved phage-resistant bacterial culture medium, particularly adapted for culturing lactic acid-developing starter bacteria for cheesemaking and the like, and to the improved medium itself. The medium is prepared from skim milk by a particular procedure which is relatively rapid and inexpensive.

More particularly, skim milk, a typical bacterial culture medium for lactic acid-developing bacteria utilized in cheesemaking, is treated to reduce the calcium content thereof to a very low level in order to impart to the milk resistance toward phage development. A conventional method of removing calcium from the skim milk is employed as by ion exchange or electrodialysis. Thereupon, selected salts contributing particular ions in preferred concentration ranges are added to the decalcified skim milk so that the medium is not only phage resistant, but provides for optimal growth of bacteria therein. Further in accordance with the present invention, preferred concentrations of selected salts are added to the decalcified skim milk so as to provide particular concentrations of selected anions and cations for optimal results.

Now referring more particularly to the steps of the method of the present invention, skim milk, that is, milk from which substantially all fat has been removed down to about 0.1 percent by weight in accordance with a conventional procedure, is decalcified.

The decalcification can take place, as previously indicated, by ion exchange, as by passing the skim milk through a suitable ion exchange resin. For example, about 1500 gallons of skim milk was ion exchanged through a 10 cubic foot ion exchange column, charged with an ion exchange resin, in sodium cycle, so that the calcium in the milk was exchanged onto the resin. The treatment in the ion exchange column was continued until the calcium content of the skim milk was reduced to an average value of less than about 30 parts per million parts of milk. All portions of the skim milk treated in the column had a calcium content of less than 50 parts per million.

Electrodialysis utilizing conventional equipment can be used in place of the ion exchange apparatus to accomplish the desired removal of calcium from the skim milk. It will be understood that conventional dialysis apparatus utilizing cation-permeable or salt-permeable membranes could be used, but is necessarily slower and less desira- It is believed, although the present invention is not limited to such theory, that the described decalcification procedures result in the removal from the skim milk of certain constituents necessary for optimal bacterial growth. These constituents are believed at least in part to constitute cations other than calcium ions.

Accordingly, in carrying out the method of the present invention, after conventional decalcification of the skim milk is accomplished to produce a phage-resistant culture medium, the skim milk is converted into an optimal growth medium for lactic acid-developing bacteria, while still maintaining its phage-resistant properties.

Such conversion is effected by introducing cations into the decalcified skim milk in the form of water-soluble salts. It has been found that potassium and magnesium cations are essential to the production of the improved bacterial culture medium and that these cations must be present in utilizable form in the decalcified skim milk in significant concentrations. It has also been found that small amounts of cobalt and manganese ions are desirably added to the decalcified skim milk. Water-soluble salts of the indicated cations may be incorporated into the low calcium skim milk by first dissolving the salts in water and then adding the aqueous solution to skim milk. In such a mixture, the potassium is present in a concentration with respect to the total added cations of between about 95 and about 98 percent while magnesium comprises substantially the remainder of the added cations, cobalt and manganese being present only in trace concentrations, representing less than 5 percent of the added cations. However, their presence is required for optimal growth of bacteria.

It has been found that it is highly desirable to provide added selected anions in the medium. Sulfate and chloride anions will normally be present in the decalcified milk and citrate and phosphate anions are desirably added for imparting optimal bacterial growth characteristics to the culture medium.

As indicated, the cations are added in the form of water soluble salts and the following salts are typical of salts which can be added to provide the desired anions and cations: Magnesium sulphate ($MgSO_4 \cdot 7H_2O$), potassium chloride, monopotassium phosphate (anhydrous), tripotassium phosphate (anhydrous) and potassium citrate, cobalt chloride ($CoCl_2 \cdot 6H_2O$), and manganese sulphate ($MnSO_4 \cdot H_2O$).

It has been found that a preferred mixture of water-soluble salts for use in converting the low calcium skim milk to the improved culture medium of the present invention comprises the following:

*Table I*

| Constitutents | Range | Preferred example |
| --- | --- | --- |
| Potassium citrate monohydrate. | 0.285–285 lbs | 48 lbs. 8 oz. |
| Magesium sulfate heptahydrate. | 0.285–114 lbs | 22 lbs. 8 oz. |
| Potassium chloride. | 0.285–285 lbs | 15 lbs. 10 oz. |
| Monopotassium phosphate. | 0.285–285 lbs | 13 lbs. 3 oz. |
| Tripotassium phosphate. | 0.285–285 lbs | 10 lbs. 3 oz. |
| Cobalt chloride hexahydrate. | 3.3–3,333 ml. of 0.34% solution. | 10 ml. of 0.34% solution. |
| Manganese sulfate monohydrate. | 1.0–1,000 ml. of 6.16% solution. | 10 ml. of 6.16% solution. |

Water is added to provide a final volume of about 100 to 110 gallons of solution.

The indicated salt solution of Table I may be added to the decalcified skim milk in a concentration of about 1 gallon per 30–34 gallons, preferably about 32 gallons, of decalcified skim milk to provide the approximate salt concentrations in the skim milk as set forth in Table II below:

*Table II*

| Constituents | Approx. percentage by weight of salt added to decalcified skim milk | |
| --- | --- | --- |
|  | Range | Preferred example |
| Potassium citrate monohydrate | 0.001–1.0 | 0.17 |
| Magnesium sulfate heptahydrate | 0.001–0.4 | 0.079 |
| Potassium chloride | 0.001–1.0 | 0.055 |
| Monopotassium phosphate | 0.001–1.0 | 0.046 |
| Tripotassium phosphate | 0.001–1.0 | 0.036 |
|  | As parts per million (p.p.m.) parts of decalcified skim milk | |
| Cobalt chloride hexahydrate | 0.001–1.0 | 0.003 |
| Manganese sulfate monohydrate | 0.005–5.0 | 0.05 |

Table II below sets forth the range of concentration of cations to be added to the skim milk:

*Table III*

| Constituents | Percentage by weight of cations added to decalcified skim milk | |
| --- | --- | --- |
|  | Range | Preferred example |
| Potassium | 0.0017–1.73 | 0.123 |
| Magnesium | 0.0001–0.039 | 0.0078 |
| Cobalt | Trace (less than 0.0001%). | Trace |
| Manganese | Trace (less than 0.0005%). | Trace |

Table IV below sets forth the range of concentration of anions preferred to be added to the skim milk:

*Table IV*

| Constituents | Percentage by weight of anions added to decalcified skim milk | |
| --- | --- | --- |
|  | Range | Preferred example |
| Citrate | 0.01–0.59 | 0.105 |
| Phosphate | 0.01–1.15 | 0.048 |

The decalcified skim milk will usually be slightly basic and, depending upon the selection of added water-soluble salts, the addition of salts will not sufficiently acidify the decalcified skim milk. Accordingly, some acid should normally be added to provide a medium having a titratable acidity from about .08 to .15 and preferably .1 to .11. The added acid should be lactic acid. The acid is desirably added to the decalcified skim milk and salt solution after they are combined.

After the salt solution and the decalcified skim milk are acidified, the mixture then can be used directly as a culture medium, following pasteurization or, for storage, can be concentrated and spray dried. The culture medium can be condensed to about 25 percent solids, pasteurized at about 165 degrees F., for one minute, cooled to about 150 degrees F., filtered and passed to a spray drier at about 145–150 degrees F. Therein it can be spray dried to provide a product which can be reconstituted to a desired solids concentration for use as a culture medium and which can be held in the dried state for an extended period of time without deterioration.

The improved medium can be used at normal solids concentration for skim milk or at other concentrations in culturing the bacteria. For example, S. lactis bacteria containing phage, as substantially all bacterial commercially available do, can be cultured in the improved medium at normal skim milk solids concentration and at the usual culturing temperatures. Therein they grow optimally and without phage development. A portion of the bacteria-laden culture medium can then be removed and used to seed ordinary skim milk which has been pasteurized but need not be decalcified. The transferred bacteria grow without difficulty in the normal skim milk and without visible phage formation, in contrast to bacteria which have not been previously cultured in the improved medium. It has been found that once the bacteria have been grown in the improved medium, they can be transferred to and cultured any number of times in regular undecalcified skim milk media without visible phage formation. There is no necessity to use the improved medium of the present invention as the growth medium for each subsequent culturing operation. However, since the improved medium assures optimal growth of bacteria therein, further culturing therein is desirable.

Accordingly, the method of the present invention includes the steps of decalcifying skim milk, and then adding to the decalcified skim milk selected cations, in the form of selected water-soluble salts, within certain ranges of concentration to optimize the bacterial growth-promoting characteristics of the decalcified medium. The medium, after such addition of selected salts, can be adjusted in pH, and other constituents can be added, as desired, after which it can be concentrated, pasteurized and spray dried to provide a product in a form which allows simple and easy storage thereof. When the medium is to be utilized, it can be reconstituted in water to any desired concentration. The following examples further illustrate certain features of the present invention:

EXAMPLE I

Skim milk was pumped (adjustable speed pump) through two sections of a plate heat exchanger at a flow rate of 3.75 gallons per minute. In the first section, the skim milk was continuously heated to 164 degrees F., and in the second section it was tempered to 135 degrees F. It was then passed through a filter to remove clots and then into an ion exchange column (10 cubic feet volume), on the sodium cycle, and through a flow adjusting valve tubular heating exchanger, with the flow adjusted to a rate of about 3.75 gallons per minute. The resulting low calcium skim milk was then collected, cooled to 50 degrees F. and held at that temperature.

During the course of the decalcification, the calcium content of the decalcified milk was periodically tested. Whenever the calcium content of the decalcified milk rose to about 30 parts per million (p.p.m.) parts of skim milk, the flow of skim milk through the ion exchange column was stopped, and the ion exchange column was then regenerated with about 1,050 gallons of a 10 percent purified aqueous sodium chloride solution at a flow rate of 5 gallons per minute, after which the column was back-washed with water to remove the residual salt solution.

The flow of skim milk through the ion exchange column was then restarted and was maintained until the decalcified skim milk passing from the column again exhibited a rise in calcium content to more than 30 p.p.m., at which time the skim milk flow to the ion exchange column was again shut off, and regeneration of the column was again carried out. A total of 1,500 gallons of commercial skim milk was ion exchanged to reduce the total calcium content to the indicated levels by the described procedure.

A composite salt solution was then prepared and incorporated into the low calcium skim milk at a level of 1 gallon per 32 gallons of the skim milk. The salt solution was prepared by adding 98 gallons of warm water together with the following salts, as shown in Table V below.

Table V

| Food grade salts: | Weight |
| --- | --- |
| Potassium citrate, N.F. | 48 lbs. 8 oz. |
| Magnesium sulfate (MgSO.7H$_2$O) | 22 lbs. 8 oz. |
| Potassium chloride, U.S.P., crystal | 15 lbs. 10 oz. |
| Monopotassium phosphate (anhydrous) | 13 lbs. 6 oz. |
| Tripotassium phosphate (anhydrous) | 10 lbs. 3 oz. |
| Cobalt chloride (CoCl$_2$.6H$_2$O), C.P. grade | 10 ml. of a 0.24% solution. |
| Manganese sulfate (MnSO$_4$.H$_2$O), C.P. grade | 10 ml. of a 6.16% solution. |

Total salts 110 lb. and final volume 104 gallons.

Approximately 47 gallons of the salt solution was added to 1,500 gallons of the low calcium skim milk.

The mixture of low calcium skim milk and salt solution was pumped into a pasteurizing vat and 80 percent (80%) lactic acid (U.S.P. food grade) was added. The lactic acid was added in a concentration of 7½ ounces per hundred gallons of the decalcified skim milk. The resulting milk medium had a titratable acidity of about .1 percent.

The resultant mixture was then condensed to 16 degrees Baumé (25 percent solids), pasteurized at 165 degrees F., for one minute and cooled to 150 degrees F. The concentrate was pumped through a pre-sanitized Sparkler filter into a feed tank for a spray drier and held in the tank at 145–150 degrees F. until passage to the spray drier. In the spray drier, the product was spray dried in accordance with conventional spray drying techniques for milk to a moisture content of about 3 percent (3%), by weight. A total yield of about 1,050 pounds of powder per 1,500 gallons of the skim milk initially processed was obtained as a finished product for a yield of 8.2 pounds per 100 pounds of skim milk.

A second bath of skim milk was processed in an identical manner after having had added thereto 25 pounds of yeast extract and 25 pounds of an enzymatic casein hydrolysate in order to improve the dispersibility of the finished product in water for reconstitution purposes.

The products of both batches exhibited excellent phage resistance and optimal bacterial growth characteristics when reconstituted to normal skim milk concentration and used as culture media for S. lactis which had been obtained from a commercial laboratory and which was known to contain phage. The products had a low concentration of included thermophilic bacteria, a very low concentration of yeast and mold, and a negligible amount of coliform bacteria. Bacterial culture in the reconstituted media could be transferred from the improved media and used in regular pasteurized skim milk (non-decalcified) without phage formation.

However, when the same type of bacteria was initially cultured in pasteurized undecalcified skim milk medium, phage formation was noticeable within a relatively short period of time, and debilitation of the bacteria occurred due to the lytic action of included phage.

Moreover, when the same type of bacteria were initially cultured in the usual decalcified skim milk, good phage resistance was obtained, but growth of the bacteria was not as rapid as with the improved medium of the present invention. Moreover, several test samples exhibited fading out and ultimate destruction of the bacteria, in contrast to optimal growth in the reconstituted product of the present invention.

EXAMPLE II

Table VI below sets forth certain characteristics of subsequent batches of the improved phage-resistant bacterial culture medium, prepared in accordance with the method of the present invention:

Table VI

| Batch No. | Skim milk processed (gallons) | Product obtained (pounds) | Yield product per 100 lbs. skim milk (pounds) | Product calcium content (p.p.m.) | Phage resistant activity | Bacteriological counts/g. product | | | |
|---|---|---|---|---|---|---|---|---|---|
| | | | | | | Total | Thermophilic | Coliform | Yeast and mold |
| 1 | 1,548 | 1,104 | 8.3 | 215 | Very good | 1,100 | 400 | 0 | 10 |
| 2 | 1,200 | 816 | 7.9 | 210 | ----do---- | 500 | 210 | 0 | 10 |
| 3 | 1,500 | 1,110 | 8.6 | 210 | ----do---- | 400 | 180 | 0 | 10 |
| 4 | 1,575 | 1,074 | 8.0 | 210 | ----do---- | 500 | 370 | 0 | 10 |
| 5* | 1,500 | 1,054 | 8.2 | 154 | ----do---- | 700 | 160 | 0 | 10 |

*Supplemented with enzymatic casein hydrolysate and yeast extract.

In each instance the product exhibited no off-odor and in the dry powder form had a good appearance, good storage properties and suitable water solubility.

EXAMPLE III

As a particular example of the substantially improved bacterial growth obtainable in the medium of the present invention in comparison with a commercially-available phage-resistant medium, the following comparison was made.

A first medium was prepared by dispersing conventional spray-dried skim milk in water at a level of 10 percent skim milk solids.

A second medium was prepared by dispersing in water a commercially-available phage-resistant preparation comprising skim milk solids treated with ion exchange resin to deplete it of calcium, but to which had not been added any cations or anions following calcium depletion. The dispersion was made up at a solids level of 10 percent.

A third medium was prepared in accordance with the teachings of the present invention. In this connection, fluid skim milk was treated with ion exchange resin to deplete the milk of calcium, as well as other cations. The decalcified skim milk was thereafter spray dried to provide a powder.

To a preselected quantity of water was added a solution comprising $KCl$; $MgSO_4 \cdot H_2O$; $CoCl_2 \cdot 6H_2O$; and $MnSO_4 \cdot 4H_2O$; to provide an aqueous solution.

To the aqueous solution was added a quantity of decalcified powdered skim milk to provide a concentration of decalcified powdered skim milk of 10 percent, and to provide added ions at the following levels: 0.1 percent $K^+$, 0.01 percent $Mg^{++}$, 0.02 p.p.m. $Mn^{++}$, and 0.0006 p.p.m. $Co^{++}$. The resultant dispersion is hereinafter identified as the third medium.

A portion of each of the first, second and third media was inoculated with *S. lactis* transferred from a skim milk control culture, and each inoculated medium was incubated for 16 hours at 70° F. to provide a first culture of *S. lactis* in each medium.

A second culture of *S. lactis* in each medium was thereafter prepared by transferring to additional portions of the first, second and third media 2 percent of the first culture, and incubating each inoculated medium for 16 hours at 70° F.

The second culture of *S. lactis* in the second medium, representing two transfers, had a pH of 5.2, and was a liquid material. This indicated that growth of *S. lactis* after two transfers in the second medium was too slow for commercial use in cheesemaking.

However, the second culture of *S. lactis* in the first and third media, also representing two transfers in the respective media, had developed sufficient acidity to set the media, indicating that the rate of growth of *S. lactis* in both media was satisfactory.

Seven additional transfers of cultures were made in the first and third media in the manner previously described, and setting of the media resulted after each transfer in each medium. It should be pointed out that, fortuitously, no phage development occurred in the first medium. In this connection, if the first, second and third media had been inoculated with phage in addition to *S. lactis*, cultures in the first medium would have failed to set after one transfer.

This experiment demonstrated that in the absence of phage development, bacterial growth in the medium of the present invention is substantially equivalent to the rate of growth obtainable in skim milk, and is substantially improved over the rate of growth of bacteria in a decalcified medium which has not been treated with additional cations or anions.

Accordingly, an improved method of providing an improved phage-resistant bacterial culture medium particularly suitable for growing of cheese starter bacteria, such as *S. lactis*, is set forth. The method is relatively simple and the improved product of the present invention provided thereby exhibits optimal growth characteristics for bacteria cultured therein while inhibiting phage formation. The product is relatively inexpensive, highly effective, readily reconstitutable to desired concentration and is storage stable. Other advantages of the present invention are as set forth in the foregoing.

Various of the features of the present invention are set forth in the appended claims.

I claim:

1. A method of making an improved phage-resistant bacterial culture medium, which method comprises reducing the calcium ion content of skim milk to not more than about 30 parts per million parts of skim milk by ion exchange, and substantially uniformly distributing potassium and magnesium ions in the milk at the following levels, expressed as percent by weight of decalcified skim milk:

| | Percent |
|---|---|
| Potassium | 0.0017–1.73 |
| Magnesium | 0.0001–0.039 |

2. A method of making an improved phage-resistant bacterial culture medium, which method comprises reducing the calcium ion content of skim milk to not more than about 30 parts per million parts of skim milk by dialysis, and substantially uniformly distributing potassium and magnesium ions in the milk at the following levels, expressed as percent by weight of decalcified skim milk:

| | Percent |
|---|---|
| Potassium | 0.0017–1.73 |
| Magnesium | 0.0001–0.039 |

3. A method of making an improved phage-resistant bacterial culture medium, which method comprises reducing the calcium ion content of skim milk to not more than about 30 parts per million parts of skim milk by electrodialysis and substantially uniformly distributing potassium and magnesium ions in the milk at the following levels expressed as percent by weight of decalcified skim milk:

| | Percent |
|---|---|
| Potassium | 0.0017–1.73 |
| Magnesium | 0.0001–0.039 |

4. A method of making an improved phage-resistant bacterial culture medium, which method comprises reducing the calcium ion content of skim milk to not more than about 30 parts per million parts of skim milk by ion exchange, and substantially uniformly distributing potassium, magnesium, cobalt and manganese ions in the milk at the following levels, expressed as percent by weight of decalcified skim milk:

Potassium _____ 0.0017–1.73 percent.
Magnesium _____ 0.001–0.039 percent.
Cobalt _____ Trace (less than 0.0001 percent).
Manganese _____ Trace (less than 0.0005 percent).

5. A method of making an improved phage-resistant bacterial culture medium, which method comprises reducing the calcium ion content of skim milk to not more than about 30 parts per million parts of skim milk by ion exchange, and substantially uniformly distributing potassium, magnesium, cobalt, manganese, citrate and phosphate ions in the milk at the following levels, expressed as percent by weight of decalcified skim milk:

Potassium _____ 0.0017–1.73 percent.
Magnesium _____ 0.0001–0.039 percent.
Cobalt _____ Trace (less than 0.0001 percent).
Manganese _____ Trace (less than 0.005 percent).
Citrate _____ 0.01–0.59 percent.
Phosphate _____ 0.01–1.15 percent.

References Cited by the Examiner

UNITED STATES PATENTS 3,041,248   6/62   Hargrove _____ 195—48

OTHER REFERENCES

Collins et al.: "Journal of Bacteriology," vol. 60, July–December 1950, pages 533 to 542.

A. LOUIS MONACELL, *Primary Examiner.*
ABRAHAM H. WINKELSTEIN, *Examiner.*